(12) United States Patent
Kim et al.

(10) Patent No.: US 12,128,846 B2
(45) Date of Patent: Oct. 29, 2024

(54) AIRBAG CUSHION AND CURTAIN AIRBAG DEVICE

(71) Applicant: HYUNDAI MOBIS CO., LTD., Seoul (KR)

(72) Inventors: Ju Kyung Kim, Yongin-si (KR); Byung Ho Min, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/342,425

(22) Filed: Jun. 27, 2023

(65) Prior Publication Data

US 2024/0140347 A1    May 2, 2024

(30) Foreign Application Priority Data

Oct. 28, 2022  (KR) .................. 10-2022-0141476
Oct. 28, 2022  (KR) .................. 10-2022-0141477

(51) Int. Cl.
  *B60R 21/213*  (2011.01)
  *B60R 21/232*  (2011.01)
  *B60R 21/2338* (2011.01)
  *B60R 21/268*  (2011.01)

(52) U.S. Cl.
  CPC .......... *B60R 21/213* (2013.01); *B60R 21/232* (2013.01); *B60R 21/2338* (2013.01); *B60R 21/268* (2013.01); *B60R 2021/23386* (2013.01); *B60Y 2200/116* (2013.01)

(58) Field of Classification Search
  CPC . B60R 21/213; B60R 21/232; B60R 21/2338; B60R 21/268; B60R 21/214; B60R 21/231; B60R 21/23138; B60R 21/233; B60R 2021/23386; B60Y 2200/116
  USPC ................................ 280/730.2, 728.1, 743.2
  See application file for complete search history.

(56) References Cited

U.S. PATENT DOCUMENTS

| | | | |
|---|---|---|---|
| 6,428,037 B1 * | 8/2002 | Bakhsh | B60R 21/232 280/730.2 |
| 2004/0017067 A1 * | 1/2004 | Daines | B60R 21/232 280/730.2 |
| 2004/0251666 A1 * | 12/2004 | Shaker | B60R 21/232 280/730.2 |
| 2007/0013173 A1 * | 1/2007 | Kino | B60R 21/213 280/730.2 |
| 2017/0008478 A1 * | 1/2017 | Kim | B60R 21/2338 |
| 2020/0108791 A1 * | 4/2020 | Ohno | B60R 21/237 |
| 2024/0075898 A1 * | 3/2024 | Sung | B60R 21/20 |

FOREIGN PATENT DOCUMENTS

| | | | |
|---|---|---|---|
| JP | 2004114842 A | * | 4/2004 |
| JP | 2007076517 A | * | 3/2007 |
| JP | 2007237914 A | * | 9/2007 |

(Continued)

*Primary Examiner* — Keith J Frisby
(74) *Attorney, Agent, or Firm* — DLA Piper LLP US

(57) ABSTRACT

An airbag cushion for installation in a negative pressure vehicle having a partition extending vertically along B-pillar trim covering a B-pillar, may include a cushion body mounted on a vehicle body in a folded state on an upper portion of the B-pillar, inflated by gas, and deployed between the B-pillar trim and the partition, and a tether connecting one side of the cushion body to the vehicle body to allow the cushion body to maintain its deployed shape.

12 Claims, 7 Drawing Sheets

(56) References Cited

FOREIGN PATENT DOCUMENTS

| | | | | |
|---|---|---|---|---|
| JP | 2015093538 | A | * | 5/2015 |
| JP | 2015157531 | A | * | 9/2015 |
| JP | 2017061205 | A | * | 3/2017 |

* cited by examiner

I - I

AIRBAG CUSHION AND CURTAIN AIRBAG DEVICE

CROSS-REFERENCE TO RELATED APPLICATION

This application claims priority to and the benefit of Korean Patent Application No. 10-2022-0141476, filed on Oct. 28, 2022 and Korean Patent Application No. 10-2022-0141477, filed on Oct. 28, 2022, in the Korean Intellectual Property Office, the disclosure of which is incorporated herein by reference in its entirety.

BACKGROUND

Field of the Invention

The present disclosure relates to an airbag cushion and a curtain airbag device.

Discussion of Related Art

Specialized vehicles for medical purposes must be equipped with a variety of medical equipment and facilities for first aid and procedures to provide emergency treatment for various patients in emergency situations. In particular, in the case of respiratory diseases, it is necessary to have negative pressure facilities to prevent the spread of pathogens from the patient to the outside, and negative pressure vehicles are configured to meet this need.

In a negative pressure vehicle, the basic system configuration is almost identical to a regular vehicle, but an additional partition is installed inside the vehicle to maintain the negative pressure within the isolated space.

Since this partition is installed in a structure that closely fits inside the vehicle, in the case of conventional curtain airbags, a cushion cannot deploy normally due to the interference of the partition.

Therefore, it is necessary to improve this.

SUMMARY OF THE INVENTION

The present disclosure is directed to solving the above problems, and the present disclosure is directed to providing an airbag cushion and curtain airbag device that enables normal deployment in a structure in which a vehicle structure is installed in B-pillar trim, such as a negative pressure vehicle with a partition.

The object of the present disclosure is not limited to the above-mentioned subject matter, and other unmentioned objects will be apparent to those skilled in the art from the following description.

An airbag cushion according to an embodiment of the present disclosure for installation in a negative pressure vehicle having a partition extending vertically along B-pillar trim covering the B-pillar, may include a cushion body mounted on a vehicle body in a folded state on an upper portion of the B-pillar, inflated by gas, and deployed between the B-pillar trim and the partition, and a tether connecting one side of the cushion body to the vehicle body to allow the cushion body to maintain its deployed shape.

The cushion body may include an incision portion extending from a lower end portion of the cushion body toward an upper end portion at a location overlapping the B-pillar trim, and the cushion body may be configured to spread along the incision portion between the B-pillar trim and the partition and to be separated into a front chamber and a rear chamber when deployed.

The incision portion may include a slit-shaped incision line partially cut inward from the lower end portion of the cushion body.

The airbag cushion may further include a nonwoven fabric extending upward along the incision line to cover the incision line, and the nonwoven fabric may have a break line extending vertically at a center overlapping the incision line in a state in which both ends are bonded to non-inflating portions provided on both sides of the incision line.

The airbag cushion may further include an adjustment patch having a band shape extending forward and backward in the cushion body, and having one end and the other end respectively bonded to non-inflating portions provided on both sides of the incision line with the incision line interposed therebetween, and the adjustment patch may be provided in a folded structure that is folded toward one of the front chamber and the rear chamber and stacked, and when the cushion body is deployed to spread the incision line, the adjustment patch is configured to release and unfold the folded structure to adjust the amount of spread of the incision line.

The adjustment patch may have a height less than half the height (length) of the incision line.

The incision portion may include a break line extending partially inward from the lower end portion of the cushion body and an incision line extending partially continuously from the break line.

The cushion body may have a structure that maintains a state in which the front chamber and the rear chamber are continuously connected via a connection chamber provided in an upper region of the incision portion.

The cushion body may include a top junction, a bottom junction and a side junction bonded along a periphery of an edge, and the bottom junction may include a pair of first extensions extending from both sides of the incision portion to the top junction along the incision portion, a second extension connected to an extended upper end of the first extension at the top of the incision portion and extending forward and backward in the cushion body, and a third extension extending from both ends of the second extension to the bottom junction.

The second extension may extend horizontally from the rear chamber and extend in a curved form sloping downward from the top of the incision portion toward the front chamber, and the connection chamber located between the second extension and the top junction may have an asymmetrical structure with an increased cross-sectional size from the rear chamber to the front chamber.

The cushion body may include a first delay chamber arranged between the third extension and the first extension in the front chamber, and a second delay chamber arranged between the third extension and the first extension in the rear chamber, and the cushion body may have an asymmetrical structure in which the volume of the first delay chamber is relatively smaller than the volume of the second delay chamber.

The cushion body may include a gas inlet connected to the top junction, and the gas inlet may be disposed on the second extension in the rear chamber.

A curtain airbag device according to an embodiment of the present disclosure, may include an airbag cushion for installation in a negative pressure vehicle having a partition extending vertically along B-pillar trim covering a B-pillar, the airbag cushion being mounted on a vehicle body in a folded state on an upper portion of the B-pillar, and an inflator connected to the airbag cushion and generating gas.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
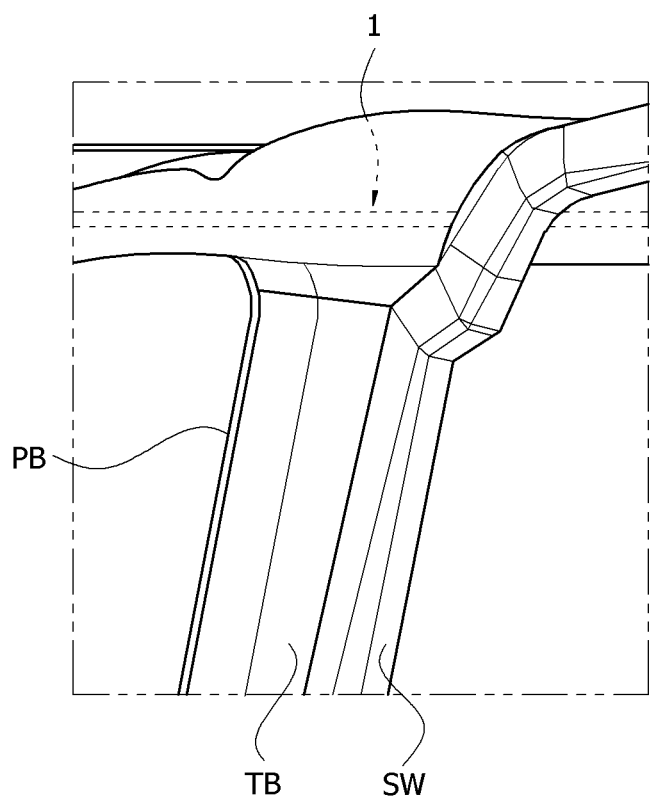
FIG. 1 is a schematic view illustrating the interior of a negative pressure vehicle in which a partition is installed.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments will be described in detail with reference to the accompanying drawings, wherein identical or corresponding components will be assigned the same reference numerals regardless of drawing numbers, and duplicate descriptions thereof will be omitted.

Figure 2:
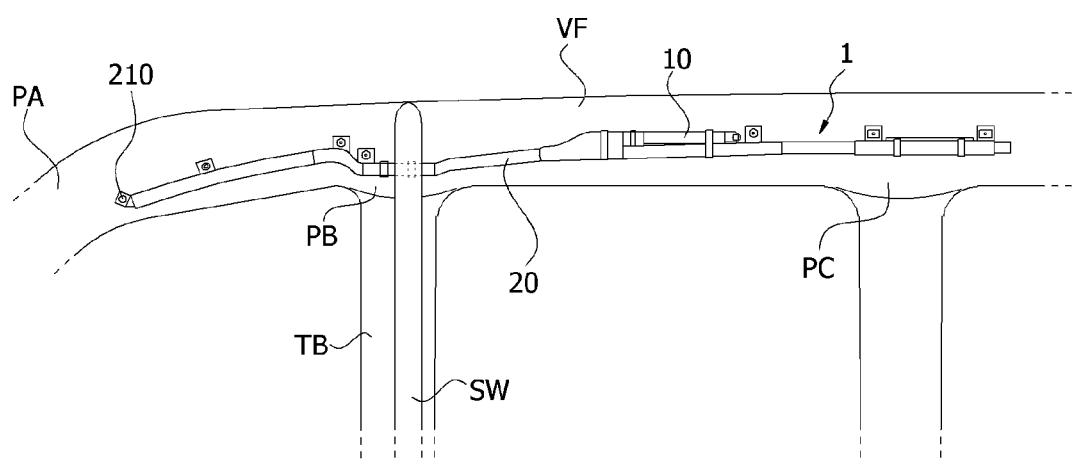
FIG. 2 is a schematic view illustrating a state in which a curtain airbag device according to an embodiment of the present disclosure is installed in the negative pressure vehicle of FIG. 1.

FIG. 1 is a schematic view illustrating the interior of a negative pressure vehicle in which a partition is installed, and FIG. 2 is a schematic view illustrating a state in which a curtain airbag device according to an embodiment of the present disclosure is installed in the negative pressure vehicle of FIG. 1.

Referring to the drawings, a curtain airbag device 1 according to an embodiment of the present disclosure may be installed within a negative pressure vehicle.

The negative pressure vehicle may include a partition SW for isolating a rear compartment from driver and passenger seats in front, and maintaining a negative pressure condition within the isolated rear compartment.

Such a partition SW may be installed on B-pillar trim TB covering a B-pillar PB, extend up and down along the B-pillar trim TB to form a loop in a width direction of the vehicle, and provided with a structure that is in close contact with an inner surface of the vehicle.

In the embodiment, the partition SW may be configured such that an edge portion abutting the vehicle is formed in the form of an air-filled tube, which is brought into close contact with the inner surface of the vehicle by air pressure.

The curtain airbag device 1 according to the embodiment of the present disclosure may include an inflator 10 and an airbag cushion 20.

The inflator 10 may be installed in a vehicle body VF connected to an A-pillar PA, a B-pillar PB, and a C-pillar PC, and may be connected to the airbag cushion 20. The inflator 10 may generate gas in response to a signal transmitted from an airbag control unit (ACU) (not shown).

The inflator 10 may be formed in the shape of a round bar and may have a gas generator and an ignition device embedded therein. In the embodiment, the inflator 10 may be provided in the form of a cylinder having an outlet for discharging gas at one end.

The airbag cushion 20 may be mounted on the vehicle body VF in a folded state on an upper portion of the B-pillar PB, and both ends thereof may be disposed in a structure extending toward the A-pillar PA and C-pillar PC, respectively.

The airbag cushion 20 may include a cushion body 100 and a tether 200.

The cushion body 100 may be configured to protect an occupant by being inflated by gas generated by the inflator 10 and deployed downward between the B-pillar trim TB and the partition SW to be disposed between the occupant and a door structure.

Figure 3:
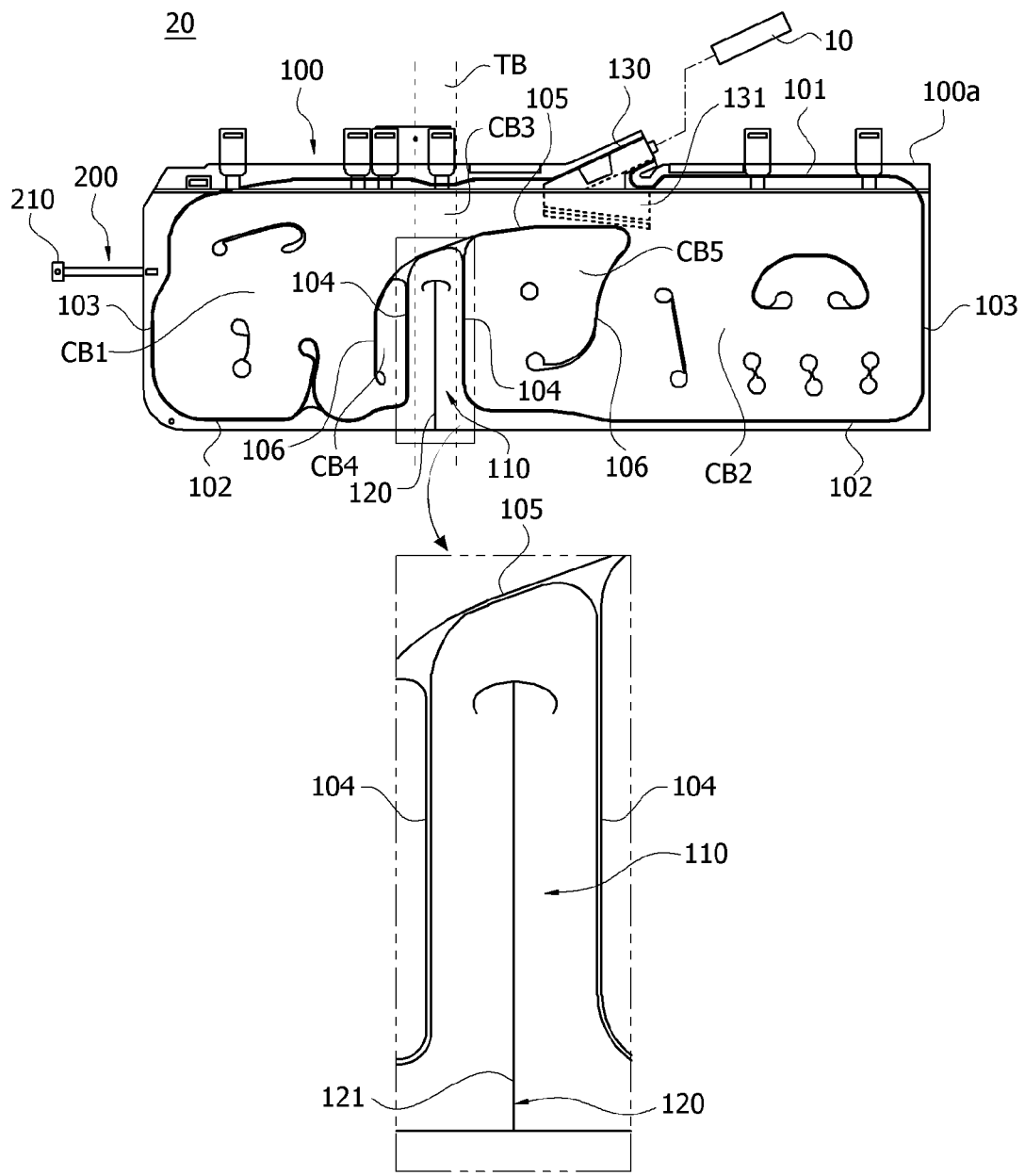
FIG. 3 is a schematic view illustrating a cushion body in which an incision portion is formed in an airbag cushion constituting the curtain airbag device.

FIG. 3 is a schematic view illustrating the cushion body 100 in the airbag cushion 20 constituting the curtain airbag device 1.

The cushion body 100 may be formed by abutting two panels 100a cut into a predetermined shape in a flat state and bonding (or sewing) the periphery thereof. In the embodiment, the panels 100a may be made of, but are not limited to, a flexible fabric material.

As shown in the drawings, the cushion body 100 may have a top junction 101, a bottom junction 102, and side junctions 103 that are joined along the periphery.

An inner region bounded by the top, bottom, and side junctions 101, 102 and 103 may correspond to an inflatable region that is inflated by gas, and an outer region of the edge may correspond to a non-inflatable region that gas is not injected into and thus does not inflate.

In particular, when the cushion body 100 is deployed downward, a non-inflating portion 110 extending from a lower end portion of the cushion body 100 toward an upper end may be provided at a position overlapping with the B-pillar trim TB to minimize interference with the partition SW in the downward deployment. Furthermore, the non-inflating portion 110 may have an incision portion 120 extending up and down.

In other words, the cushion body 100 may be provided with the non-inflating portion 110 that partially extends upward into the inner inflating region at a position overlapping the B-pillar trim TB in a non-inflating region of the lower end portion to divide the inflating region into a front chamber CB1 having a relatively small volume and a rear chamber CB2 having a relatively large volume, and the incision portion 120 extending vertically may be formed in the non-inflating portion 110.

Further, the cushion body 100 may be configured to spread along the incision portion 120 between the B-pillar trim TB and the partition SW and separate into the front chamber CB1 and the rear chamber CB2 when deployed. This will be described in more detail below.

Referring to the drawings, the bottom junction 102 may include a pair of first extensions 104 extending from both sides of the incision portion 120 toward the top junction 101 along the incision portion 120, a second extension 105 connected to an extended upper end of the first extension 104 at the top of the incision portion 120 and extending forward and backward in the cushion body 100, and third extensions 106 extending from both ends of the second extension 105 toward the bottom junction 102.

In this case, the non-inflating portion 110 described above may be defined as a region enclosed by the pair of first extensions 104 positioned side by side on either side of the B-pillar trim TB and a portion of the second extension 105 connecting upper ends of the first extensions 104.

Further, the cushion body 100 may have a structure in which the front chamber CB1 and the rear chamber CB2 are continuously connected through a connection chamber CB3 provided in an upper region of the incision portion 120.

In the embodiment, the second extension 105 may extend horizontally from the rear chamber CB2 and extend in a curved form sloping downward from the top of the incision portion 120 toward the front chamber CB1. Accordingly, the connection chamber CB3 located between the second extension 105 and the top junction 101 may have an asymmetrical structure with an increased cross-sectional size from the rear chamber CB2 to the front chamber CB1.

The cushion body 100 may include a gas inlet 130 connected to the top junction 101. Gas generated by the inflator 10 may be introduced into the cushion body 100 through the gas inlet 130.

The gas inlet 130 may be disposed on the second extension 105 in the rear chamber CB2.

The gas inlet 130 may be provided with a diffuser pocket 131 that distributes and supplies gas to the front chamber CB1 and the rear chamber CB2.

The diffuser pocket 131 may have openings in the front and rear, and may be arranged such that the opening on one side faces the rear chamber CB2 and the opening on the other side faces the connection chamber CB3. Accordingly, the diffuser pocket 131 may supply a portion of the gas directly to the rear chamber CB2 and another portion to the front chamber CB1 via the connection chamber CB3.

In this case, the problem that the rear chamber CB2 is supplied with gas before the front chamber CB1 due to the diffuser pocket 131 being located on the rear chamber CB2, resulting in a difference in expansion speed from the front chamber CB1, can be solved by the asymmetrical structure of the connection chamber CB3 described above. That is, as the connection chamber CB3 has a cross-sectional size that increases as it approaches the front chamber CB1, a larger amount of gas is supplied to the front chamber CB1, even though the diffuser pocket 131 is located on the rear chamber CB2, so that the front and rear chambers CB1 and CB2 can be expanded simultaneously.

As shown in the drawings, the cushion body 100 may include a first delay chamber CB4 arranged between the third extension 106 and the first extension 104 in the front chamber CB1 and a second delay chamber CB5 arranged between the third extension 106 and the first extension 104 in the rear chamber CB2.

In this case, the cushion body 100 may have an asymmetrical structure in which the volume of the first delay chamber CB4 is relatively smaller than the volume of the second delay chamber CB5.

Meanwhile, the cushion body 100 is configured such that the incision portion 120 formed in the non-inflating portion 110 is spread between the B-pillar trim TB and the partition SW during the deployment of the cushion body 100 and separated into the front chamber CB1 and the rear chamber CB2 based on the partition SW, and thus the interference of the partition SW is minimized.

As shown in FIG. 3, the incision portion 120 may include a slit-shaped incision line 121 partially cut inward from the lower end portion of the cushion body 100 and may be formed in a structure extending vertically along the non-inflating portion 110.

Figure 8:
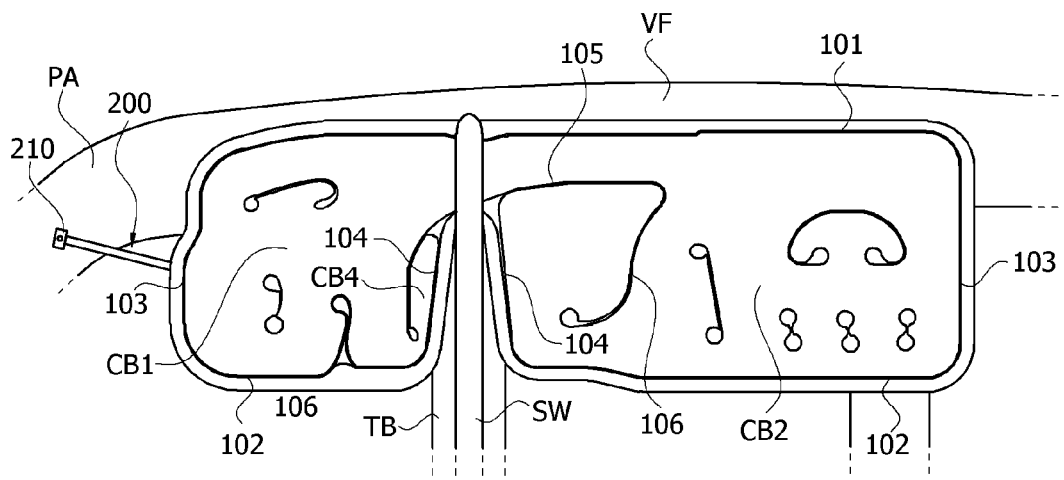
FIG. 8 is a schematic view illustrating a state in which the cushion body according to an embodiment of the present disclosure is inflated and deployed.

Thus, as shown in FIG. 8, when the cushion body 100 is deployed, the incision portion 120 is configured to open along the incision line 121, thereby allowing the cushion body 100 to normally deploy downward without being interfered with by the partition SW, and the front chamber CB1 and rear chamber CB2 may be deployed and positioned on either side of the partition SW in a fully inflated state.

Figure 4:
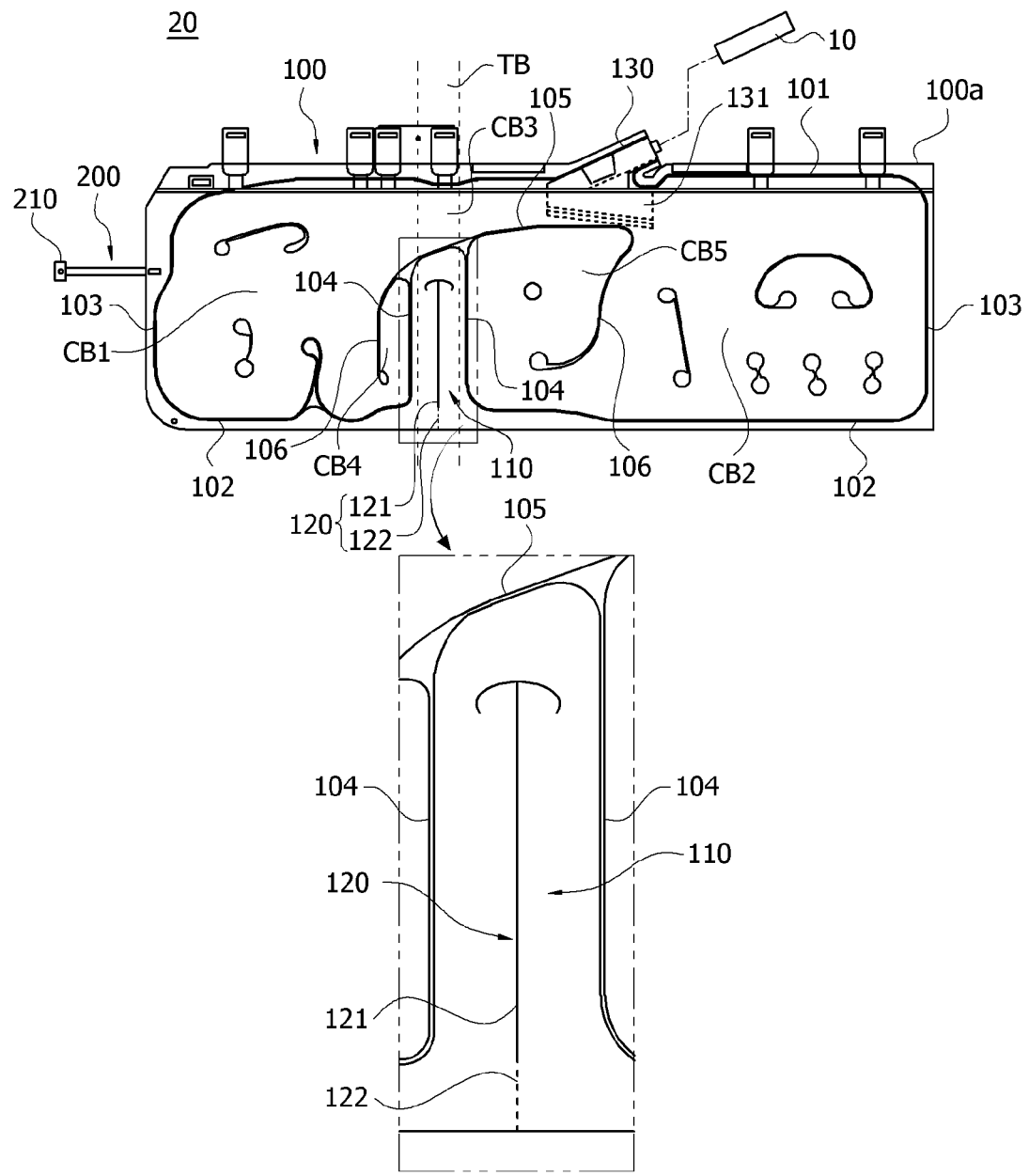
FIG. 4 is a schematic view illustrating a cushion body in which an incision portion is formed, according to a modified example.

FIG. 4 is a schematic view illustrating a cushion body 100 in which an incision portion 120 is formed, according to a modified example.

As shown in FIG. 4, the incision portion 120 includes a break line 122 extending partially inward from a lower end portion of the cushion body 100 and an incision line 121 extending partially continuously from the break line 122 and may be formed in a structure in which the break line 122 and the incision line 121 are continuously connected and extend vertically along the non-inflating portion 110.

Accordingly, when the cushion body 100 is deployed, the incision portion 120 is broken from the break line 122 and starts to spread, and then is configured to spread continuously along the incision line 121.

The present embodiment differs from the embodiment disclosed in FIG. 3 in that the incision line 121 extends from the break line 122 formed at the lower end portion of the cushion body 100. That is, in the embodiment according to FIG. 3, the lower end portion of the cushion body 100 in the non-inflated portion is provided in a state of being separated by the incision line 121, but in the present embodiment, the lower end portion of the cushion body 100 is provided in a state of being connected by the break line 122 rather than being separated.

As the lower end portion of the cushion body 100 is provided in a connected state, the folding operation can be performed stably when roll-folding the cushion body 100 from the lower end portion to the upper end portion, and the folding performance is improved accordingly.

Figure 5:
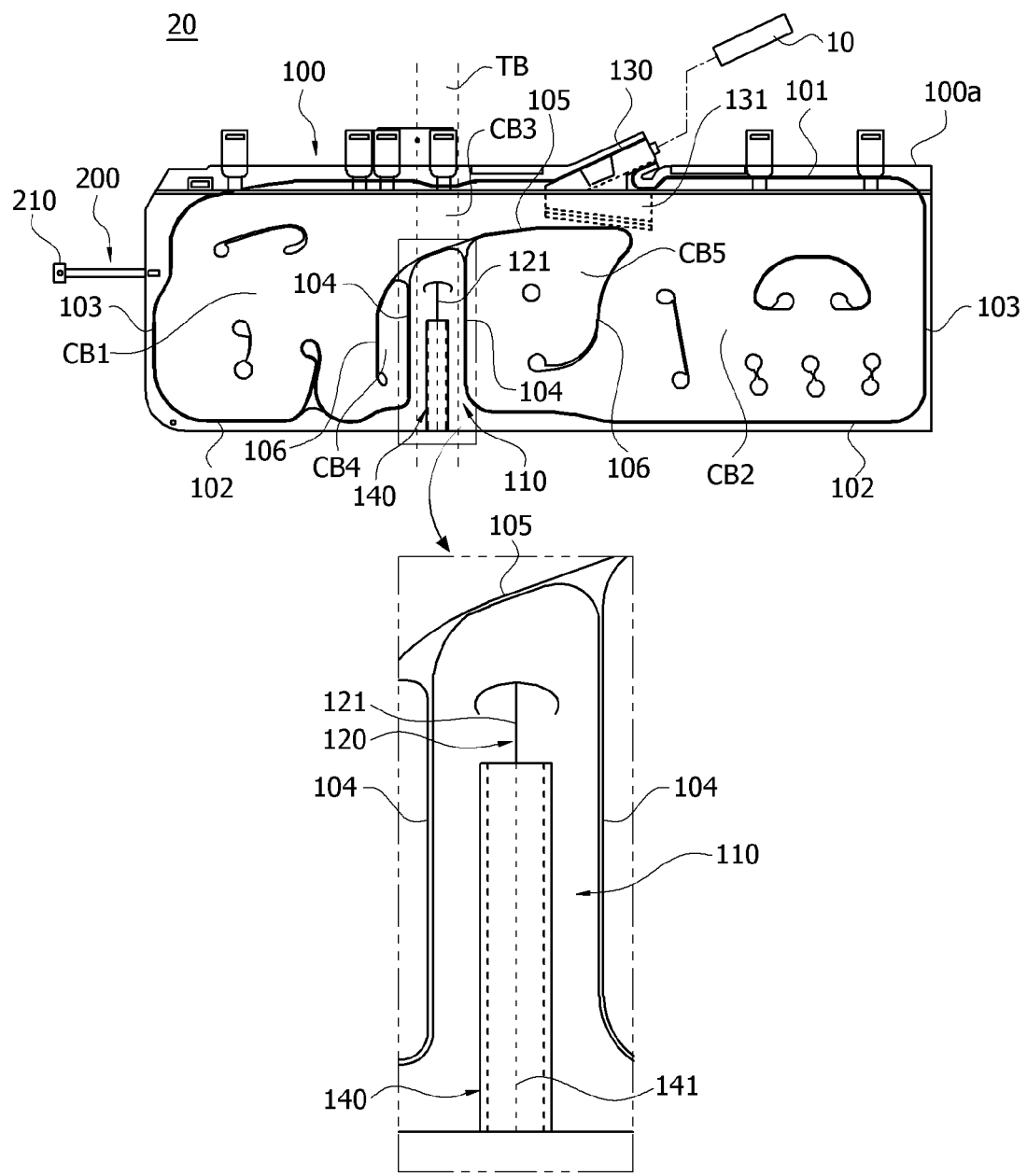
FIG. 5 is a schematic view illustrating another embodiment of the cushion body in the airbag cushion of FIG. 3.

FIG. 5 is a schematic view illustrating another embodiment of the cushion body 100.

As shown in FIG. 5, in a structure where the incision portion 120 is provided as a slit-shaped incision line 121, the cushion body 100 may include a nonwoven fabric 140 extending upward along the incision line 121 to cover the incision line 121, in a state in which the incision line 121 is partially cut inward from the lower end portion of the cushion body 100.

The length of the nonwoven fabric 140 may be less than the length of the incision line 121, and the nonwoven fabric 140 may be attached to the lower end portion of the cushion body 100 in a state in which both ends of the nonwoven fabric 140 in the width direction are bonded to the non-inflating portion 110 provided on each side of the incision line 121 with the incision line 121 interposed therebetween.

The nonwoven fabric 140 may have a break line 141 extending vertically at a center overlapping the incision line 121.

Accordingly, when the cushion body 100 is deployed, the incision portion 120 may be configured to open along with the incision line 121 as the nonwoven fabric 140 is broken along the break line 141.

Figure 6:
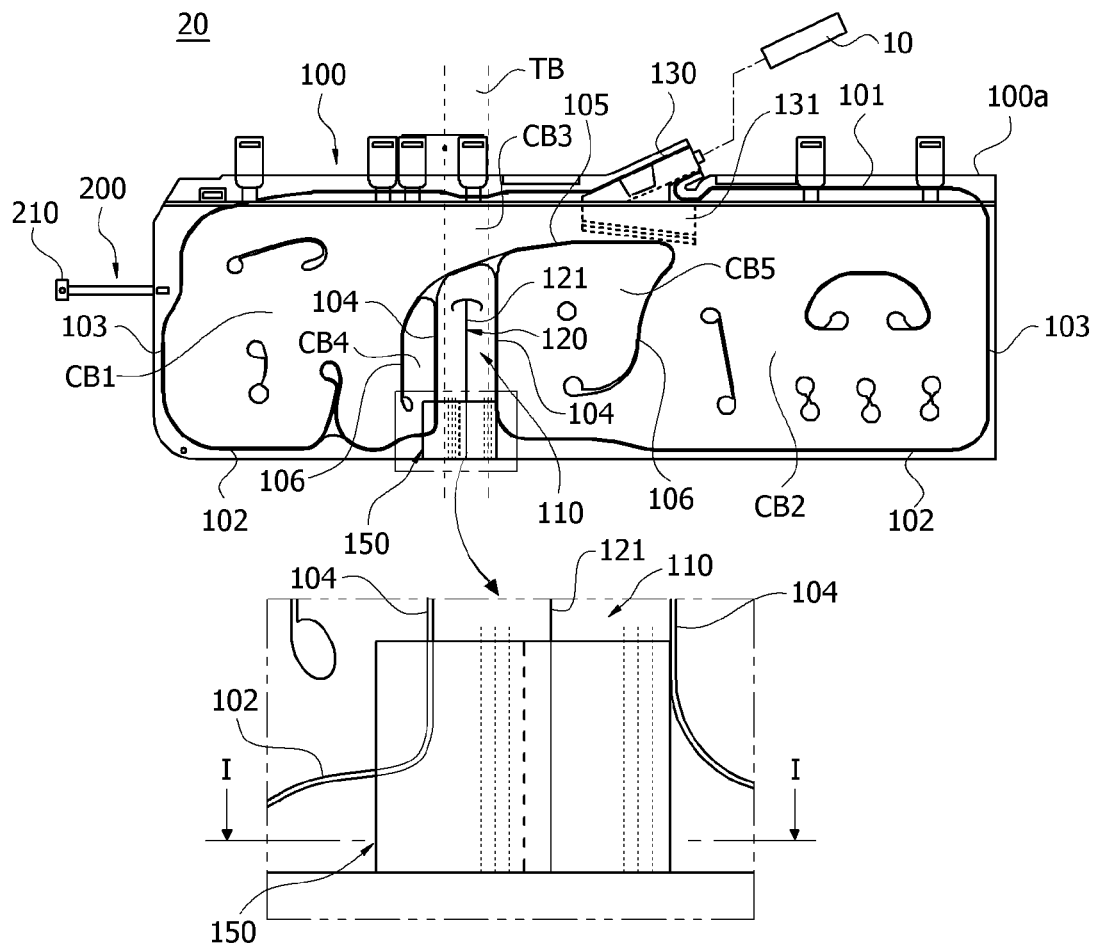
FIG. 6 is a schematic view illustrating still another embodiment of the cushion body in the airbag cushion of FIG. 3.
Figure 7:
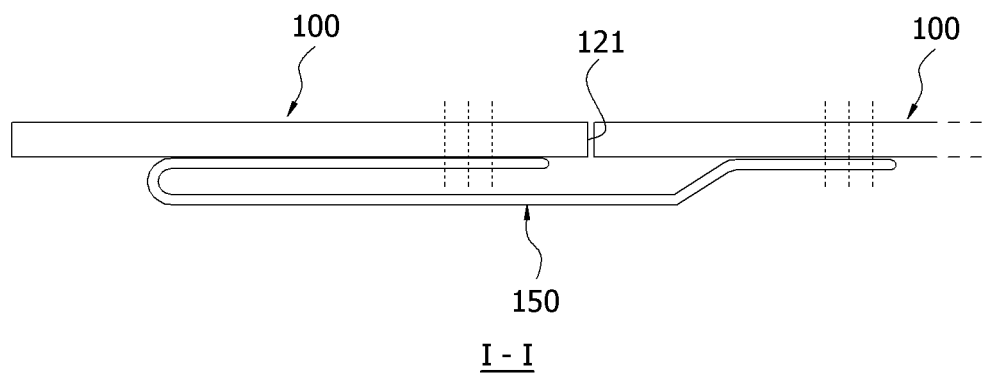
FIG. 7 is a schematic view illustrating a cross-section along line 1-1 in FIG. 6.

FIGS. 6 and 7 are schematic views illustrating still another embodiment of the cushion body 100.

Referring to FIGS. 6 and 7, the cushion body 100 may include an adjustment patch 150 attached to the lower end portion of the cushion body 100 and partially covering the incision line 121, in a state in which the incision line 121 is partially cut inward from the lower end portion of the cushion body 100 in the form of a slit.

The adjustment patch 150 may have a height that is less than half the height (length) of the incision line 121 and may have a band shape extending forward and backward in the cushion body 100. In the embodiment, the adjustment patch 150 may be made of, but is not limited to, a flexible fabric material.

The adjustment patch 150 may have one end and the other end respectively bonded to the non-inflating portion 110 with the incision line 121 interposed therebetween and may be provided in a folded structure that is folded toward one of the front chamber CB1 and the rear chamber CB2 and stacked while attached to one surface of the cushion body 100.

Figure 9:
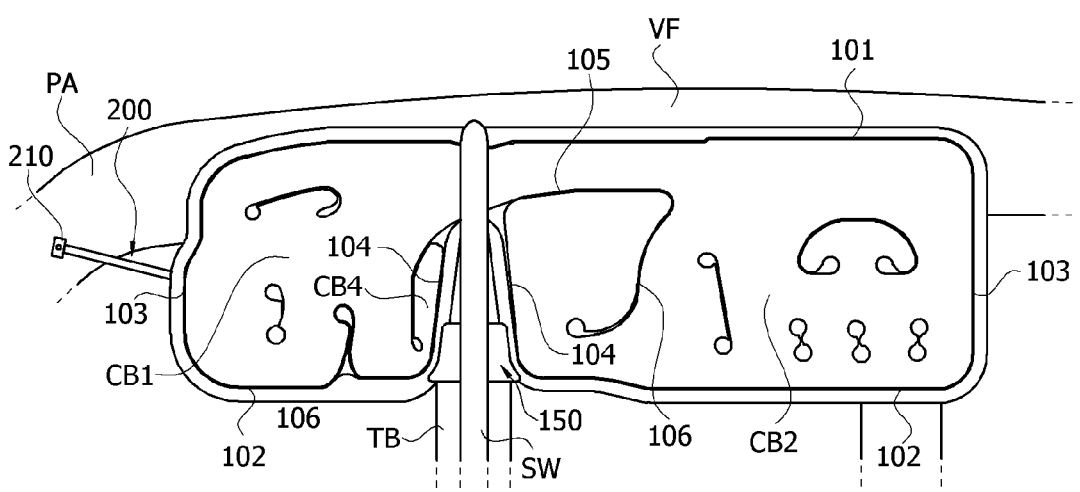
FIG. 9 is a schematic view illustrating a state in which a cushion body according to another embodiment of the present disclosure is inflated and deployed.

As shown in FIG. 9, the adjustment patch 150 may be configured such that when the cushion body 100 is deployed to spread the incision line 121, the folded structure is released and unfolded to adjust the amount of spread of the incision line 121. Furthermore, the amount of spread of the incision line 121 may be adjusted by adjusting the length of the adjustment patch 150.

In other words, the adjustment patch 150 may restrict excessive spread of the incision line 121 at the lower end portion of the cushion body 100, thereby preventing the tearing of the cushion body 100 at the top of the incision line 121, resulting in damage. Furthermore, it is possible to prevent the occupant from not being protected because the deployment positions of the front chamber CB1 and the rear chamber CB2 are displaced from the position of the occupant due to the excessive spread of the incision line 121.

The tether 200 connects one side of the cushion body 100 to the vehicle body VF, allowing the cushion body 100 to maintain its deployment shape.

The tether 200 may have one end connected to the non-inflating region provided at the front end of the front chamber CB1, and the other end connected to the vehicle's A-pillar PA via a fixing tool 210.

The tether 200 may prevent the front chamber CB1 from contracting toward the B-pillar PB during deployment of the cushion body 100 and failing to maintain its deployment shape. That is, it is possible to prevent the cushion body 100 from being caught on the partition SW due to contraction of the front chamber CB1, and thus the front chamber CB1 from not being normally deployed.

According to an embodiment, a tether (not shown) having one end connected to the non-inflating region provided at a rear end of the rear chamber CB2, and the other end connected to the C-pillar PC may be further provided.

Another embodiment of the airbag cushion constituting the curtain airbag device according to the embodiment of the present disclosure will be described with reference to FIGS. 10 and 11.

Figure 10:
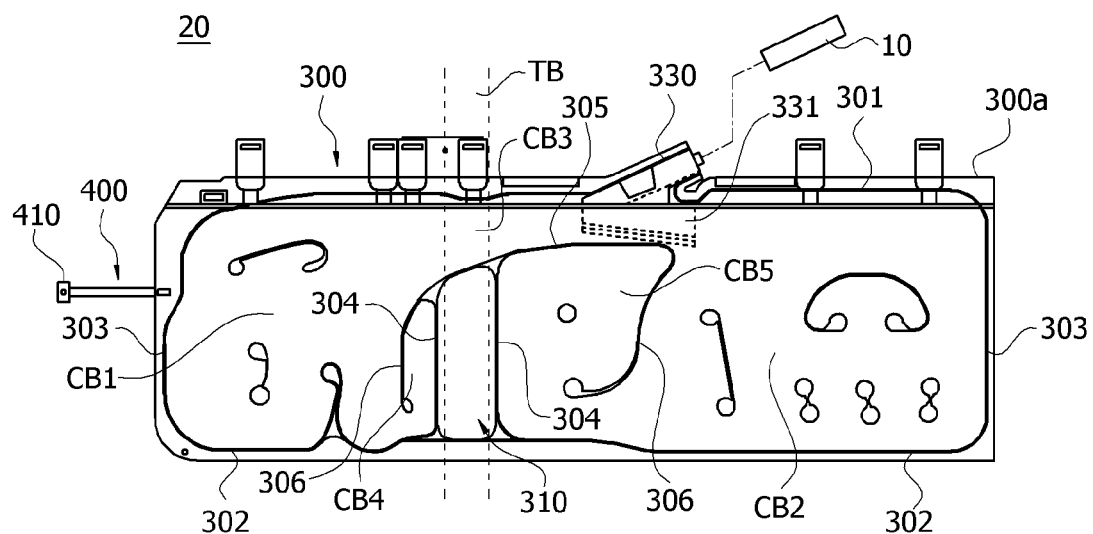
FIG. 10 is a schematic view illustrating a cushion body in another embodiment of an airbag cushion constituting a curtain airbag device.
Figure 11:
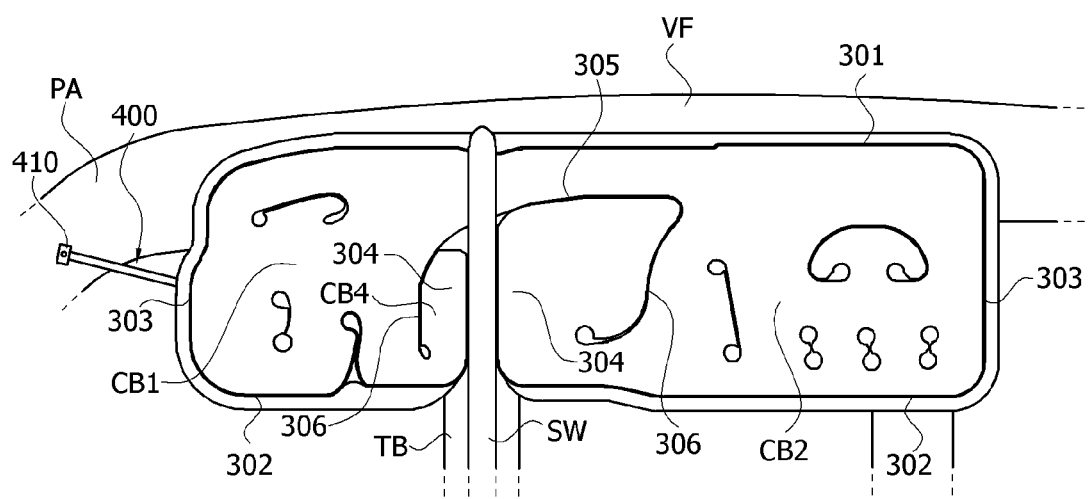
FIG. 11 is a schematic view illustrating a state in which the cushion body in the airbag cushion of FIG. 10 is inflated and deployed.

FIG. 10 is a schematic view illustrating a cushion body in an airbag cushion constituting a curtain airbag device and FIG. 11 is a schematic view illustrating a state in which the cushion body of FIG. 10 is inflated and deployed.

An airbag cushion 20 may be mounted on a vehicle body VF in a folded state on an upper portion of a B-pillar PB, and both ends extend toward an A-pillar PA and a C-pillar PC, respectively.

The airbag cushion 20 may include a cushion body 300 and a tether 400.

The cushion body 300 may be configured to inflate by the gas generated by an inflator 10 and deploy downward between B-pillar trim TB and a partition SW to protect an occupant by being disposed between the occupant and the door structure.

As shown in FIG. 10, the cushion body 300 may be formed by abutting two panels 300a cut into a predetermined shape in a flat state and bonding (or sewing) the periphery thereof. In the embodiment, the cushion body 300 may have a top junction 301, a bottom junction 302, and side junctions 303 that are joined along the periphery.

The bottom junction 302 may include a pair of first extensions 304 extending from both sides of the B-pillar trim TB toward the top junction 301 along the B-pillar trim TB, a second extension 305 connected to an extended upper end of the first extension 304 and extending forward and backward in the cushion body 300, and third extensions 306 extending from both ends of the second extension 305 toward the bottom junction 302.

In particular, the cushion body 300 may include a non-inflating portion 310 extending from a lower end portion of the cushion body 300 toward an upper end portion at a location overlapping the B-pillar trim TB to minimize interference with the partition SW during downward deployment.

This non-inflating portion 310 may be defined as a region having a roughly 'n' shape enclosed by the pair of first extensions 304 located side by side on either side of the B-pillar trim TB and a portion of the second extension 305 connecting upper ends of the first extensions 304. In this case, the non-inflating portion 310 may be formed with a width greater than the width of the partition SW.

In other words, the cushion body 300 may include the non-inflating portion 310 that partially extends upward into an inner inflating region at a position overlapping the B-pillar trim TB in a non-inflating region of the lower end portion.

Also, as shown in FIG. 11, the cushion body 300 may be configured such that when deployed, the non-inflating portion 310 moves downward between the B-pillar trim TB and the partition SW to partition the cushion body 300 into a front chamber CB1 having a relatively small volume and a rear chamber CB2 having a relatively large volume based on the partition SW.

As such, the cushion body 300 has a non-inflating portion 310, which is a non-inflating region for the portion where the partition SW is located, and is allowed to expand downward between the B-pillar trim TB and the partition SW through the non-inflating portion 310 so that interference by the partition SW is minimized. This prevents damage to the B-pillar trim TB and the partition SW and ensures deployability.

As shown, the cushion body 300 may have a structure in which the front chamber CB1 and the rear chamber CB2 are continuously connected through a connection chamber CB3 provided in the upper region of the non-inflating portion 310.

In the embodiment, the second extension 305 may extend horizontally from the rear chamber CB2 and extend in a curved form sloping downward from the upper region of the non-inflating portion 310 toward the front chamber CB1. Accordingly, the connection chamber CB3 located between the second extension 305 and the top junction 301 may have an asymmetrical structure with an increased cross-sectional size from the rear chamber CB2 to the front chamber CB1.

The cushion body 300 may include a gas inlet 330 connected to the top junction 301. Gas generated by the inflator 10 may be introduced into the cushion body 300 through the gas inlet 330.

The gas inlet 330 may be disposed on the second extension 305 in the rear chamber CB2.

The gas inlet 330 may be provided with a diffuser pocket 331 that distributes and supplies gas to the front and rear chambers CB1 and CB2.

The diffuser pocket 331 may include openings in the front and rear, and may be arranged such that the opening on one side faces the rear chamber CB2 and the opening on the other side faces the connection chamber CB3. Accordingly, the diffuser pocket 331 may supply a portion of the gas directly to the rear chamber CB2 and another portion to the front chamber CB1 via the connection chamber CB3.

In this case, the problem that the rear chamber CB2 is supplied with gas before the front chamber CB1 due to the diffuser pocket 331 being located on the rear chamber CB2, resulting in a difference in expansion speed from the front chamber CB1, can be solved by the asymmetrical structure of the connection chamber CB3 described above. That is, as the connection chamber CB3 has a cross-sectional size that increases as it approaches the front chamber CB1, a larger amount of gas is supplied to the front chamber CB1, even though the diffuser pocket 331 is located on the rear chamber CB2, so that the front and rear chambers CB1 and CB2 can be expanded simultaneously.

As shown, the cushion body 300 may include a first delay chamber CB4 arranged between the third extension 306 and the first extension 304 in the front chamber CB1 and a second delay chamber CB5 arranged between the third extension 306 and the first extension 304 in the rear chamber CB2.

In the embodiment, the cushion body 300 may have an asymmetrical structure in which the volume of the first delay chamber CB4 is relatively smaller than the volume of the second delay chamber CB5.

The first delay chamber CB4 and the second delay chamber CB5 may each be patterned to be filled with gas through the space between an end of the third extension 306 and the bottom junction 302 so that the first delay chamber CB4 and the second delay chamber CB5 inflate later than the front chamber CB1 and the rear chamber CB2.

Accordingly, the cushion body 300 may be configured such that, upon deployment, the first delay chamber CB4 and the second delay chamber CB5 are deployed in an uninflated state and the first delay chamber CB4 and the second delay chamber CB5 are inflated in a state in which the non-inflating portion 310 moves downward.

This delayed expansion of the first delay chamber CB4 and the second delay chamber CB5, which are located on either side of the non-inflating portion 310, enables the non-inflating portion 310 to be smoothly deployed downward between the B-pillar trim TB and the partition SW.

In addition, it is possible to prevent the occupant from not being protected because the first delay chamber CB4 and the second delay chamber CB5 are inflated so that the partition SW is tightly sandwiched between the first delay chamber CB4 and the second delay chamber CB5, the fluidity according to the deployment of the cushion body 300 is reduced, and thus the deployment positions of the front chamber CB1 and the rear chamber CB2 are displaced from the position of the occupant.

The tether 400 connects one side of the cushion body 300 to the vehicle body VF so that the cushion body 300 maintains its deployment shape.

The tether 400 may have one end connected to a non-inflating region provided at the front end of the front chamber CB1, and the other end connected to the vehicle's A-pillar PA via a fixing tool 410. The tether 400 may prevent the front chamber CB1 from contracting toward the B-pillar PB and failing to maintain the deployed shape while the cushion body 300 is deployed.

As shown above, the curtain airbag device 1 according to the embodiment of the present disclosure is installed in a negative pressure vehicle having the partition SW extending vertically along the B-pillar trim TB, and the cushion body 100 inflated by the gas is configured such that in the process of downward deployment between the B-pillar trim TB and the partition SW, the incision portion 120 formed at a position overlapping the B-pillar trim TB is opened and separated into the front chamber CB1 and the rear chamber CB2 based on the partition SW.

Accordingly, in a structure in which the partition SW is brought into close contact with the B pillar trim, the interference of the partition SW can be minimized by spreading the cushion body 300 along the incision portion 120 to both the left and right sides of the partition SW, thus enabling normal deployment of the cushion body 300.

Furthermore, the cushion body 300 is configured such that, as the cushion body 300 is inflated and deployed downward between the B-pillar trim TB and the partition SW, the non-inflating portion 310 formed at a position overlapping the B-pillar trim TB penetrates between the B-pillar trim TB and the partition SW and moves downward to partition the cushion body 300 into the front chamber CB1 having a relatively small volume and the rear chamber CB2 having a relatively large volume based on the partition SW.

Accordingly, in a structure in which the partition SW is brought into close contact with the B pillar trim, the interference of the partition SW can be minimized as the cushion body 300 is deployed downward between the B pillar trim and the partition SW through the non-inflating portion 310 that does not inflate, and thus the normal deployment of the cushion body 300 can be achieved.

According to an embodiment of the present disclosure, it is possible to provide an airbag cushion and curtain airbag device that enable normal deployment in a structure in which a vehicle structure is installed in B-pillar trim, such as a negative pressure vehicle with a partition.

The effects of the present disclosure are not limited to above-mentioned subject matter, and other unmentioned effects will be apparent to those skilled in the art from the description of the claims.

It should be noted that the effects of the present disclosure are not limited to the above-described effect, and other effects not mentioned will be clearly understood to those skilled in the art from the following descriptions.

Although the exemplary embodiments of the present disclosure have been described, it will be understood by those skilled in the art that the present disclosure may be variously modified and changed within the spirit and scope of the present disclosure described in the following patent claims. In addition, differences related to such modifications and changes should be construed as being included in the scope of the present disclosure defined in the appended claims.

What is claimed is:

1. An airbag cushion for installation in a negative pressure vehicle having a partition extending vertically along B-pillar trim covering a B-pillar, the airbag cushion comprising:
   a cushion body adapted to be mounted on a vehicle body in a folded state on an upper portion of the B-pillar, inflated by gas, and deployed between the B-pillar trim and the partition, and
   a tether adapted to connect one side of the cushion body to the vehicle body to allow the cushion body to maintain its deployed shape;
   wherein the cushion body comprises an incision portion extending from a lower end portion of the cushion body toward an upper end portion at a location overlapping the B-pillar trim; and
   the cushion body is configured to spread along the incision portion between the B-pillar trim and the partition and to be separated into a front chamber and a rear chamber when deployed.

2. The airbag cushion of claim 1, wherein the incision portion comprises a slit-shaped incision line partially cut inward from the lower end portion of the cushion body.

3. The airbag cushion of claim 2, further comprising a nonwoven fabric extending upward along the incision line to cover the incision line,
   wherein the nonwoven fabric has a break line extending vertically at a center overlapping the incision line in a state in which both ends are bonded to non-inflating portions provided on both sides of the incision line.

4. The airbag cushion of claim 2, further comprising an adjustment patch having a band shape extending forward and backward in the cushion body, and having one end and another end respectively bonded to non-inflating portions provided on both sides of the incision line with the incision line interposed therebetween,
   wherein the adjustment patch is provided in a folded structure that is folded toward one of the front chamber and the rear chamber and stacked, and when the cushion body is deployed to spread the incision line, the adjustment patch is configured to release and unfold the folded structure to adjust an amount of spread of the incision line.

5. The airbag cushion of claim 4, wherein the adjustment patch has a height less than half a length of the incision line.

6. The airbag cushion of claim 1, wherein the incision portion comprises a break line extending partially inward from the lower end portion of the cushion body and an incision line extending partially continuously from the break line.

7. The airbag cushion of claim 1, wherein the cushion body has a structure that maintains a state in which the front chamber and the rear chamber are continuously connected via a connection chamber provided in an upper region of the incision portion.

8. The airbag cushion of claim 7, wherein:
   the cushion body comprises a top junction, a bottom junction, and a side junction bonded along a periphery of an edge, and the bottom junction comprises first extensions extending from both sides of the incision portion toward the top junction along the incision portion, a second extension connected to extended upper ends of the first extensions at the top of the incision portion and extending forward and backward in the cushion body, and third extensions extending from both ends of the second extension toward the bottom junction.

9. The airbag cushion of claim 8, wherein the second extension extends horizontally from the rear chamber and extends in a curved form sloping downward from the top of the incision portion toward the front chamber, and the connection chamber located between the second extension and the top junction has an asymmetrical structure with an increased cross-sectional size from the rear chamber to the front chamber.

10. The airbag cushion of claim 8, wherein:
the cushion body comprises a first delay chamber arranged between a forwardmost third extension of the third extensions and a forwardmost first extension of the first extensions in the front chamber, and a second delay chamber arranged between a rearwardmost third extension of the third extensions and a rearwardmost first extension of the first extensions in the rear chamber, and
the cushion body has an asymmetrical structure in which a volume of the first delay chamber is relatively smaller than a volume of the second delay chamber.

11. The airbag cushion of claim 8, wherein the cushion body comprises a gas inlet connected to the top junction, and the gas inlet is disposed on the second extension in the rear chamber.

12. A curtain airbag device, comprising:
the airbag cushion according to claim 1; and
an inflator connected to the airbag cushion and generating gas.

* * * * *